(12) United States Patent
Pabedinskas et al.

(10) Patent No.: US 6,844,040 B2
(45) Date of Patent: Jan. 18, 2005

(54) REINFORCED COMPOSITE STRUCTURAL MEMBERS

(76) Inventors: Arunas Antanas Pabedinskas, 12 Laurel Avenue, Etobicoke, Ontario (CA), M9B 4S8; Werner Karl Hermann Gregori, 8 Lakewood Court, Hawkstone, Ontario (CA), L0L 1T0

( * ) Notice: Subject to any disclaimer, the term of this patent is extended or adjusted under 35 U.S.C. 154(b) by 0 days.

(21) Appl. No.: 10/260,535

(22) Filed: Oct. 1, 2002

(65) Prior Publication Data

US 2004/0062915 A1 Apr. 1, 2004

(51) Int. Cl.⁷ .......................... B29D 22/00; B32B 3/20
(52) U.S. Cl. .................. 428/36.91; 428/178; 428/188; 428/192; 428/409
(58) Field of Search .......................... 428/34.1, 36.91, 428/68, 178, 188, 192, 35.7, 409

(56) References Cited

U.S. PATENT DOCUMENTS

| | | | |
|---|---|---|---|
| 1,400,078 A | 12/1921 | Kempton | |
| 2,230,628 A | 2/1941 | Sahlberg | |
| 2,319,105 A | 5/1943 | Billner | |
| 3,201,862 A | 8/1965 | Gotoh | |
| 3,470,598 A | 10/1969 | Berthelsen | |
| 3,487,518 A | 1/1970 | Hopfeld | |
| 3,825,036 A | 7/1974 | Stent | |
| 3,922,828 A | 12/1975 | Patton | |
| 3,933,960 A | 1/1976 | Cameron et al. | |
| 3,965,942 A | * 6/1976 | Hatch | 139/384 R |
| 3,993,726 A | 11/1976 | Moyer | |
| 4,125,979 A | * 11/1978 | McLaughlin | 52/259 |
| 4,204,821 A | 5/1980 | Gauchel et al. | |
| 4,261,390 A | 4/1981 | Belofsky | |
| 4,296,062 A | 10/1981 | Gauchel et al. | |
| 4,305,982 A | * 12/1981 | Hirsch | 428/34 |
| 4,312,917 A | 1/1982 | Hawley | |
| 4,492,063 A | 1/1985 | Schock et al. | |
| 4,514,449 A | * 4/1985 | Budich et al. | 428/76 |
| 4,588,538 A | 5/1986 | Chung et al. | |
| 4,615,163 A | 10/1986 | Curtis et al. | |
| 4,740,405 A | 4/1988 | Tanaka et al. | |
| 4,840,826 A | * 6/1989 | Shirasaki et al. | 428/36.91 |
| 4,915,764 A | 4/1990 | Miani | |
| 4,937,028 A | 6/1990 | Glemet et al. | |
| 5,030,662 A | 7/1991 | Banerjie | |
| 5,096,645 A | 3/1992 | Fink | |
| 5,212,223 A | 5/1993 | Mack et al. | |
| 5,238,633 A | 8/1993 | Jameson | |
| 5,307,843 A | 5/1994 | Jarrin et al. | |
| 5,364,254 A | 11/1994 | Vezzoli et al. | |
| 5,511,355 A | 4/1996 | Dingler | |
| 5,585,155 A | 12/1996 | Heikkila et al. | |
| 5,650,224 A | 7/1997 | March et al. | |
| 5,658,519 A | 8/1997 | March et al. | |
| 5,702,782 A | 12/1997 | Goto et al. | |
| 5,744,228 A | 4/1998 | Tingley | |

(List continued on next page.)

OTHER PUBLICATIONS

Webster's II Dictioary 1984, p. 762.*

Primary Examiner—Donald J. Loney
(74) Attorney, Agent, or Firm—Nancy E. Hill; Hill & Schumacher

(57) ABSTRACT

The invention comprises reinforced composite structural members which are formed by bonding reinforcing sections to predetermined areas on the outside surface of a hollow profile formed from a thermoplastic resin cellulosic fiber composite material, where the predetermined areas are located substantially away from the center of mass of the composite profile. The reinforcing sections have a higher modulus than the composite material used to form the hollow profile. The invention also comprises processes for forming these reinforced composite structural members.

28 Claims, 10 Drawing Sheets

U.S. PATENT DOCUMENTS

| | | |
|---|---|---|
| 5,779,961 A | 7/1998 | Teutsch |
| 5,783,125 A | 7/1998 | Bastone et al. |
| 5,789,477 A | 8/1998 | Nosker et al. |
| 5,791,047 A | 8/1998 | Skalka |
| 5,792,529 A | 8/1998 | May |
| 5,866,264 A | 2/1999 | Zehner et al. |
| 5,974,760 A | 11/1999 | Tingley |
| 5,987,838 A | 11/1999 | Beck |
| 6,007,656 A | 12/1999 | Heikkila et al. |
| 6,105,321 A | 8/2000 | KarisAllen et al. |
| 6,106,944 A | 8/2000 | Heikkila et al. |
| 6,367,780 B1 | 4/2002 | Retterer |
| 2001/0002609 A1 | 6/2001 | Dagher et al. |
| 2002/0015819 A1 | 2/2002 | Edwards et al. |
| 2002/0037409 A1 | 3/2002 | Tunis |

* cited by examiner

REINFORCED COMPOSITE STRUCTURAL MEMBERS

FIELD OF THE INVENTION

This invention is directed to decks and other outside constructions, and in particular to reinforced composite structural members which have sufficient strength and stiffness to be used in place of wooden members.

BACKGROUND TO THE INVENTION

The majority of decks constructed in North America are constructed from wood, this includes the support structure as well as the decking surface. However, with age and exposure to moisture, wood can split, warp, twist, splinter and rot. These effects are most apparent on the horizontal decking surfaces where water can collect, especially if the deck boards become cupped. Recently, a number of manufacturers have started offering extruded profiles made from moisture resistant materials which can be used as an alternative to wood decking in the construction of decks. These products, such as those produced by Trex Company Inc., Winchester, Va., and Advanced Environmental Recycling Technologies Inc. (AERT), Springdale, Ariz., are said to offer a number of advantages over wood, particularly relating to the moisture resistance of the materials used in their manufacture.

The majority of these alternative decking products are currently being produced from composite materials which consist of thermoplastic resins that contain a high percentage by weight (30–70%) of cellulosic fillers. These fillers are typically derived by the comminution or attrition by grinding or milling of wood, plant matter or agricultural byproducts such as hulls, husks, shells and straws to produce discrete cellulosic fibers or cellulosic particles. Cellulosic fibers which are a byproduct of paper production or recycling are also being used as fillers. In addition to being cheaper than glass fibers (a common reinforcing filler for thermoplastic resins), cellulosic fibers are typically much lower in cost than the thermoplastic resins in which they are used as fillers, so a higher cellulosic fiber content in the resin used to produce the alternative decking product results in a lower cost product. Higher cellulosic fiber content can also result in improved mechanical properties such as strength and stiffness. These composite materials generally show very good moisture resistance and aging characteristics in comparison to wood. However, too high a cellulosic fiber content can result in products which may not be as moisture resistant as desired. In this application, it is these thermoplastic resin cellulosic fiber composite materials which are being referred to when the term composite is used.

While there are a growing number of manufacturers of these composite decking products, most of these manufacturers recommend against using their products as structural members such as joists or posts. Typically, the manufacturers of the composite decking products recommend using wood to construct the structure on which the composite decking product is installed. This results in a decking surface which may have a lifetime guarantee, while the wooden structure supporting it is still prone to moisture damage and may need replacement if the damage is severe enough. The effects of moisture on the wooden support structure can be minimized by using naturally moisture resistant wood species such as cedar or redwood, which are usually sold at a substantial premium to less moisture resistant species. A more economical solution has been to use treated lumber as the structural members with the composite decking products. However, the effect of the treatment will decrease over time as the treatment chemicals leach out of the wood. As such, using moisture resistant wood species and pressure treated lumber will delay the decay of the wood, but it will not prevent splitting, warping, twisting and splintering of the wood which is caused by repeated cycles of the wood getting wet and drying out and can significantly weaken the structural members.

In February of 2002, the United States Environmental Protection Agency announced a phaseout of chromated copper arsenate (CCA) treated lumber by the treated lumber industry. At the time, CCA treated lumber accounted for over 80% of pressure treated lumber sold in North America. The phase out was the result over the concerns over the toxicity of the CCA and the fact that it can readily leach out from lumber and contaminate nearby soil. Other chemical preservatives are currently available, with the most likely successor to CCA being alkaline copper quaternary (ACQ), which is substantially more expensive than CCA, and will result in higher treated lumber prices. The various chemical formulations used in treating lumber typically act as fungicides which enhance the moisture resistance of the wood by killing fungi which can lead to rot and decay. However, according to the Canadian Environment Ministry, all chemical wood preservatives are classified as pesticides as they achieve decay control as a result of their significant toxicity, and that while the potency of the various preservatives varies, all are poisonous to some degree and are potentially hazardous to humans and other forms of life. In addition, the announced phase out of CCA treated lumber has resulted in increased prices for lumber from moisture resistant wood species such as cedar, as a result of increasing demand.

While a number of composite decking product manufacturers are promoting composite railing posts (which is considered a structural application), currently there is only one type of product which is being promoted for use as structural framing members to replace wood framing in building decks, and that is glass fiber reinforced high density polyethylene (HDPE) plastic lumber, such as that produced by US Plastic Lumber Ltd., Boca Raton, Fla. These products are solid and mimic the sizes and shape of standard lumber profiles (i.e. 2×6, 2×8, etc.). However, as a result of the significantly higher density of these products, they are substantially heavier than wood of the same size. In addition, these products can be difficult to cut and drill and can quickly dull saw blades and drill bits as a result of the glass fiber content. Finally, because of the relatively high cost of the glass fiber reinforcement, the cost of these products can be many times that of wood even when they are produced using recycled HDPE.

In producing composite structural members, their weight might also be a concern, as the density of the composite materials is typically significantly higher than that of wood. As a result, composite structural members may be substantially heavier than similarly sized wood structural members. One way to reduce the weight and consequently the cost of the composite structural member is to reduce the amount of material used in their production by making hollow profiles rather than a solid ones. This offers an additional advantage, since reducing the weight of the structural member reduces the load on any support structure for the structural member. However, despite the fact that the composite materials can be substantially stiffer than the thermoplastic resins that they are made from, the stiffness (as measured by the flexural modulus) of the composite materials may be only 10% to 50% of that of wood. As a result, removing material to produce a hollow composite profile may result in a product which may not have the strength and stiffness required for its use as a structural member and thus the composite member would have to be substantially larger than the wood structural member it is meant to replace. Further, such a composite member may result in allowable spans (as for a joist) which are unacceptably short.

One way to overcome this situation, is to reinforce the hollow composite profiles. This can be done by using materials, which have much better mechanical properties (i.e. stronger and stiffer) than the composite materials, in conjunction with them. One option is to insert reinforcing elements such as metallic rods or tubing or pieces of wood into the hollow cavities of the composite profile, as is recommended by some manufacturers of composite railing posts. The reinforcing capacity of these types of inserts is substantially reduced by the fact that typically there is no actual bond between the reinforcing element and the composite profile, beyond a friction fit. Therefore, reinforcing materials which are bonded in some way to the composite profiles would result in potentially stronger and stiffer structural members. Particularly, if these reinforcing elements are located where the greatest stresses are experienced in the specific structural member. In general, the outside surfaces of the structural member furthest from the center of mass experience the greatest stresses, for example the top and bottom surface of a joist. Coincidentally, reinforcing materials located furthest from the center of mass of the object to be reinforced yield the greatest reinforcing effect for a given amount material. Therefore, placing reinforcing materials on the outside surfaces of the structural member furthest from the center of mass, such as the top and bottom surfaces of a joist, would be the most effective and efficient approach.

Therefore it would be desirable to have a product which could be used to replace untreated lumber, pressure treated lumber, cedar and redwood used as structural members in the construction of decks and other outdoor constructions, particularly in conjunction with moisture resistant composite decking products. Preferably, the product would have the same moisture resistant characteristics of the decking products. It would be easy to work with (i.e. have the workability of wood) and easy to install. The product would also be as similar as possible to the wooden structural members it is meant to replace in terms of weight, mechanical properties and cost, if possible. The product would make use of reinforcing materials which are bonded to the outside surfaces furthest from the center of mass of the product to achieve greater strength and stiffness. In addition the product would have hollow sections in order to reduce the weight of the product and the amount of material used in its manufacture, thereby reducing its cost. It is also desirable to have processes which could be used to produce these reinforced composite structural members.

SUMMARY OF THE INVENTION

The invention comprises reinforced composite structural members which are formed by bonding reinforcing sections to preselected areas on the outside surface of a hollow profile extruded from a thermoplastic resin cellulosic fiber composite material, where the preselected areas are located substantially away from the center of mass of the composite profile. The reinforcing sections have a higher modulus than composite material used to form the hollow profile.

The invention also comprises processes for forming these reinforced composite structural members. The processes include the steps of forming a hollow profile by extruding a thermoplastic resin cellulosic fiber composite material, cooling and sizing the hollow profile as well as bonding reinforcing sections to the hollow profile. The reinforcing sections have a higher modulus than the composite material and they are bonded onto the profile at predetermined areas, which are situated on the outside surface of said profile substantially away from the center of mass of said profile.

In addition the composite profile may be extruded with surface features which serve to enhance the bond between the higher modulus reinforcing sections and the composite profile.

One embodiment of the reinforced composite structural members of the present invention comprises a hollow extruded composite profile with reinforcing sections that consist of a higher modulus thermoplastic material that has been bonded to the profile by coextrusion. The higher modulus thermoplastic material may or may not contain reinforcing fillers and may have a coextruded tie layer material between it and the composite profile.

A second embodiment of the reinforced composite structural members of the present invention comprises a hollow extruded composite profile with reinforcing sections that consist of thermoplastic material that has been bonded to the profile by coextrusion and into which continuous reinforcing strands have been embedded. The thermoplastic material contains thermoplastic resin which may or may not contain reinforcing fillers and may have a coextruded tie layer material between it and the composite profile. The continuous reinforcing strands may consist of single or multiple continuous fibers or wires and in one preferable embodiment consist of metal wire rope or metal cable which are produced by combining multiple individual wires.

A third embodiment of the reinforced composite structural members of the present invention comprises a hollow extruded composite profile with reinforcing sections that consist of single or multiple layers of a continuous fiber reinforced thermoplastic resin tape have been bonded to the hollow profile. In order to aid in bonding the reinforced thermoplastic tape to the composite profile, the composite profile may have a tie layer material coextruded onto its surface in the areas where the reinforced thermoplastic tape is subsequently bonded.

The invention also involves processes for forming the various embodiments of the reinforced composite structural members. For the embodiment of the reinforced composite structural members of the present invention which comprises an extruded composite profile with reinforcing sections that consist of single or multiple layers of a continuous fiber reinforced thermoplastic tape that have been bonded to profile, a preferred embodiment of the bonding process involves heating the inside surface of the thermoplastic tape and the specific locations on the outside surface of the composite profile where it is desired to bond the thermoplastic tape and then bonding the thermoplastic tapes to the composite profile by forcing them together.

Other features and advantages of this invention will become apparent from the following description taken in conjunction with the accompanying drawings wherein are set forth, by way of illustration and example, certain embodiments of this invention. The drawings constitute a part of this specification and include exemplary embodiments and illustrate various features and designs thereof.

DETAILED DESCRIPTION OF THE INVENTION

Although the invention will be described in terms of specific embodiments, it will be readily apparent to those skilled in the art that various modifications, rearrangements and substitutions can be made without parting from the spirit of this invention.

Figure 1:
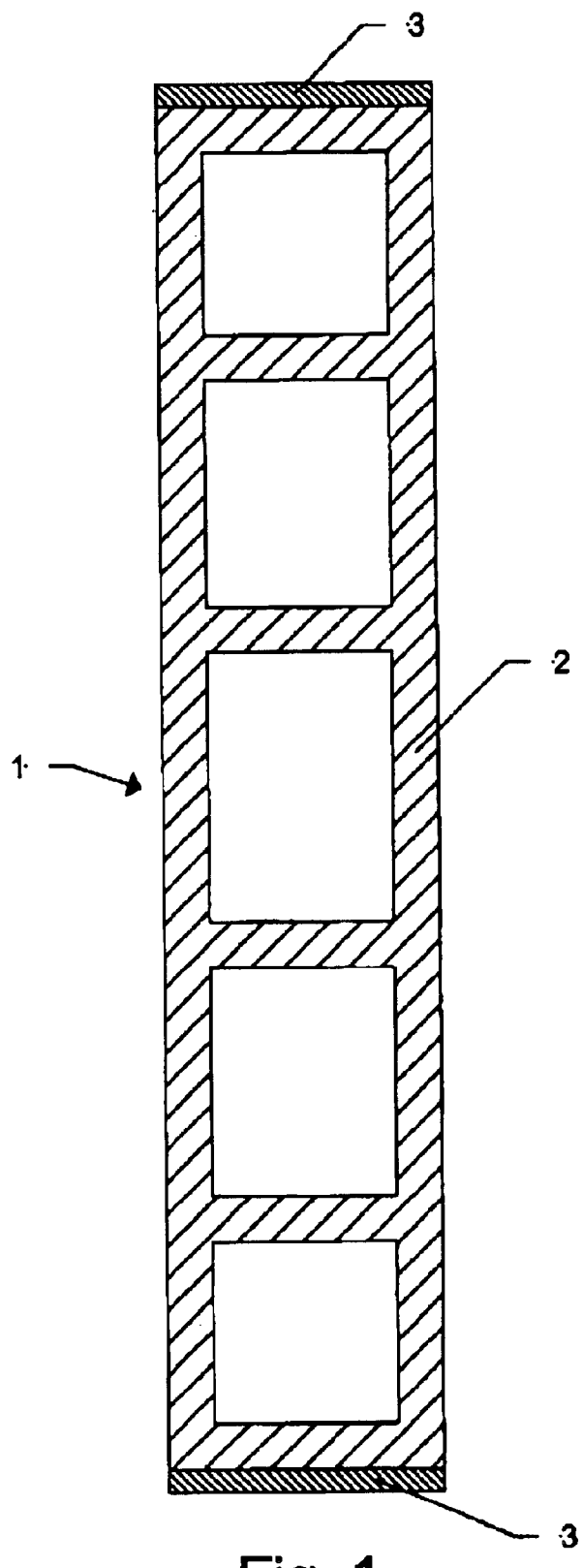
FIG. 1 shows a cross-section of one embodiment of a reinforced composite structural member of this invention with reinforcing sections that consist of a higher modulus thermoplastic material which have been bonded by coextrusion to the surface of a rectangular composite profile.
Figure 2:
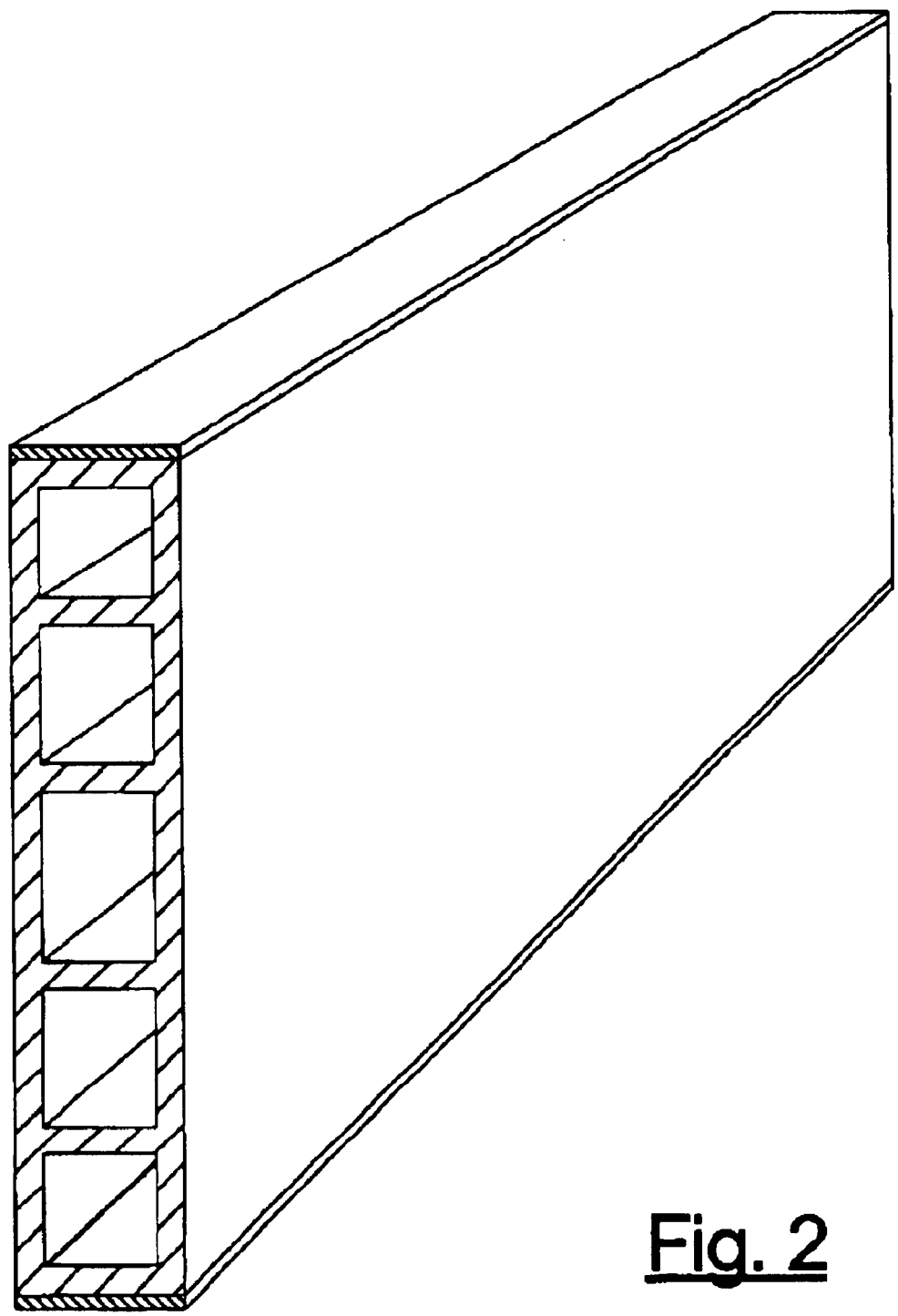
FIG. 2 shows a perspective view of the embodiment of the reinforced composite structural member shown in FIG. 1.
Figure 3:
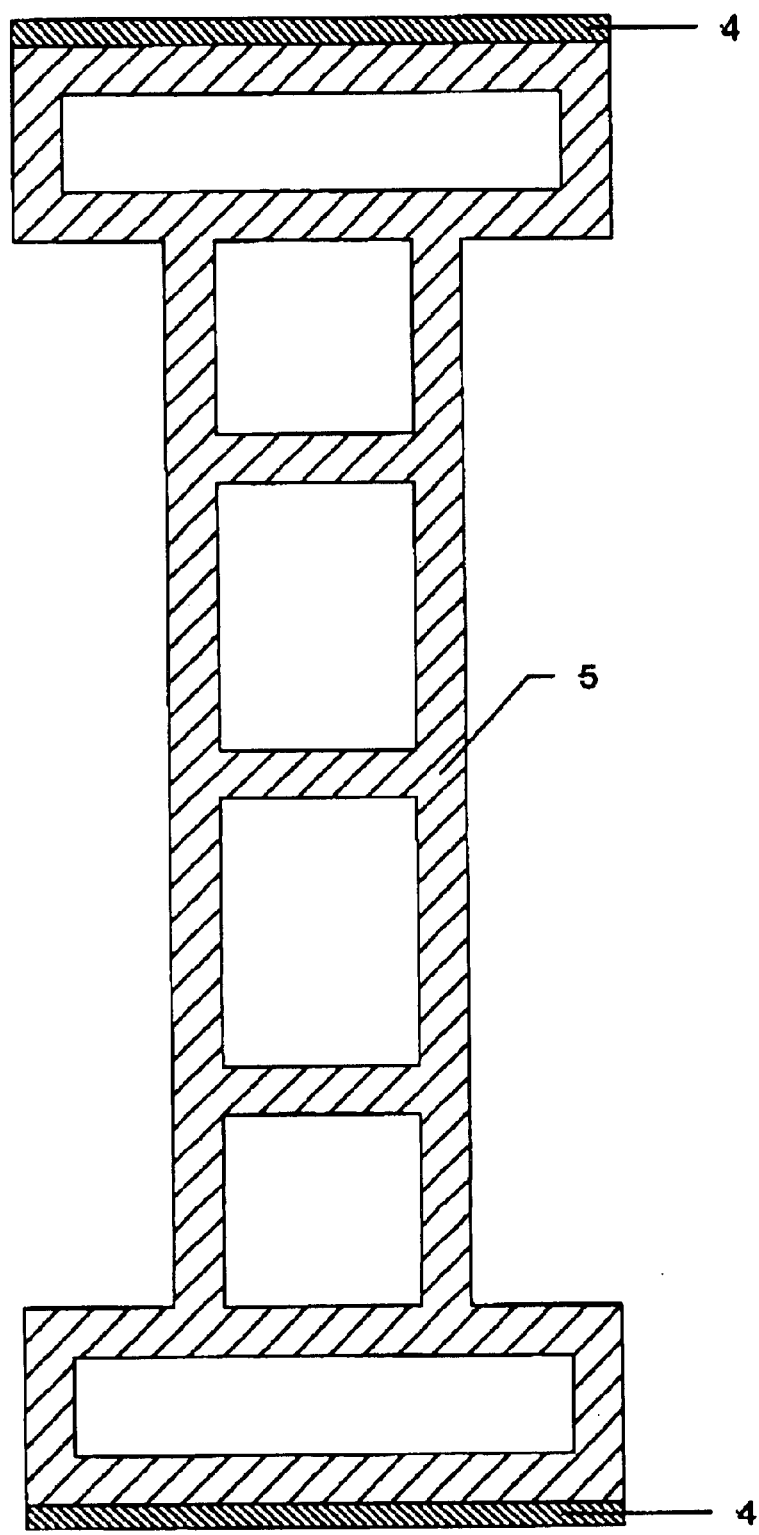
FIG. 3 shows a cross-section of an alternative embodiment of a reinforced composite structural member of this invention with reinforcing sections that consist of a higher modulus thermoplastic material which have been bonded by coextrusion to the surface of an I-beam shaped composite profile.
Figure 4:
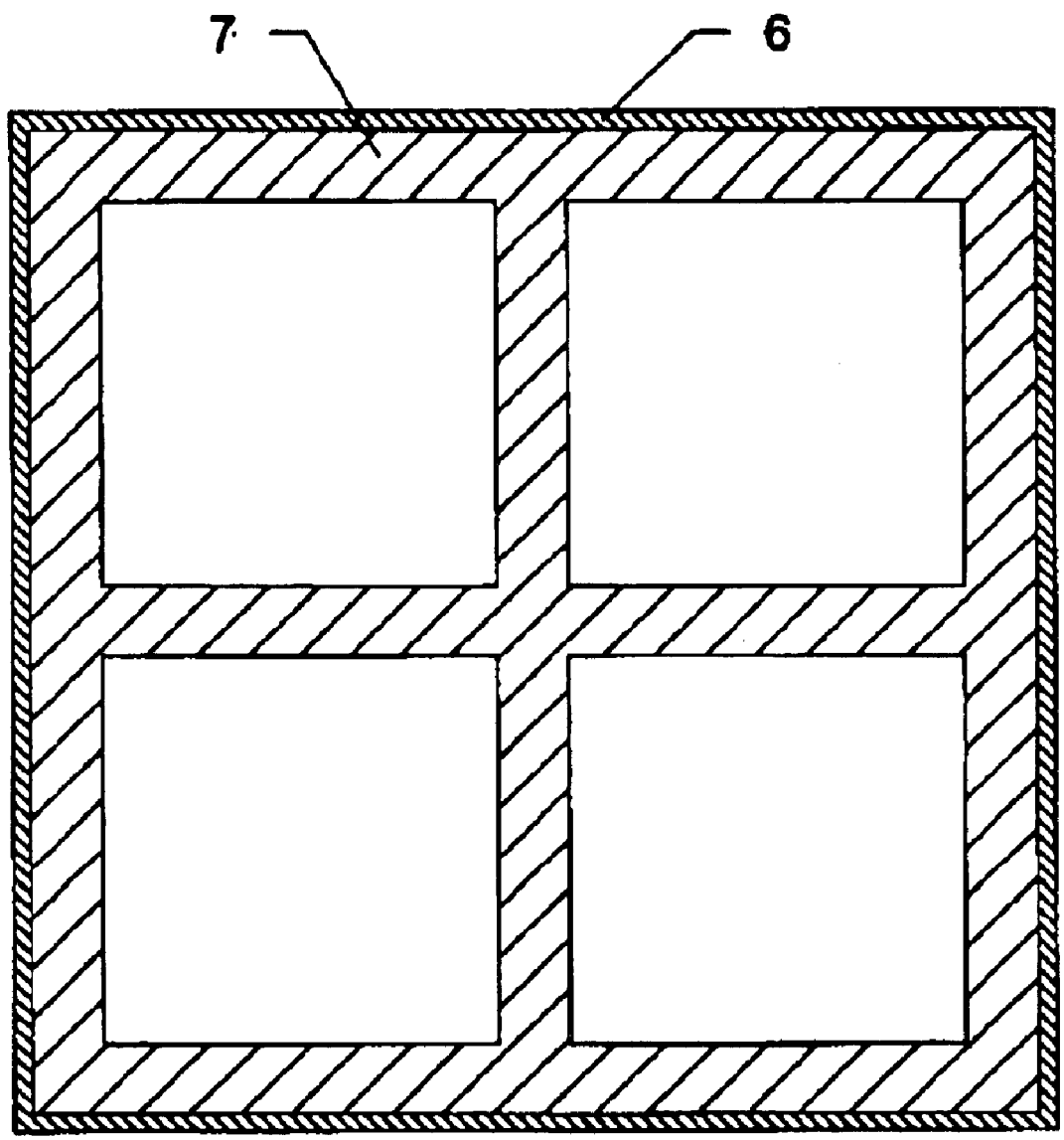
FIG. 4 shows a cross-section of an alternative embodiment of a reinforced composite structural member of this invention with reinforcing sections that consist of a higher modulus thermoplastic material which have been bonded by coextrusion to the surface of a square composite profile.

FIG. 1 shows a cross-section of one embodiment of a reinforced composite structural member of this invention, while FIG. 2 shows a perspective view. The reinforced composite structural member 1 is comprised of a hollow extruded composite profile 2 having a generally elongate rectangular shape with two reinforcing sections 3 that consist of thermoplastic material that has been bonded by coextrusion to composite profile having a rectangular shape. The term composite is used herein to mean a thermoplastic resin cellulosic fiber composite material (as discussed above), while the term thermoplastic material is used herein to mean a thermoplastic resin that may include a filler and is discussed in more detail below. The coextruded thermoplastic material is chosen such that it has a higher modulus (greater stiffness) than the composite material that comprises the profile. FIG. 3 shows a cross-section of another embodiment of a reinforced composite structural member of this invention where the reinforcing sections 4 consist of higher modulus thermoplastic material which has been bonded by coextrusion to a composite profile 5 having a generally I-beam shape. Both of these embodiments would be suitable as replacements for structural members such as joists, and as such the sections of higher modulus thermoplastic material have been coextruded on the top and bottom surfaces on the composite profile. These are the regions of the structural member which would experience the greatest stresses under load when used as a joist. The top and bottom surfaces also correspond to the surfaces furthest away from the center of mass of the composite profile. FIG. 4 shows an embodiment of a reinforced composite structural member of this invention having a generally square shape which may be used as a post. In the case of a post, such as in a railing, the structural member may experience equal stresses on all of the outside surfaces. Therefore, it would be advantageous that the reinforcing sections, which in this embodiment consist of coextruded higher modulus thermoplastic material 6, completely cover the composite profile 7.

Figure 5:
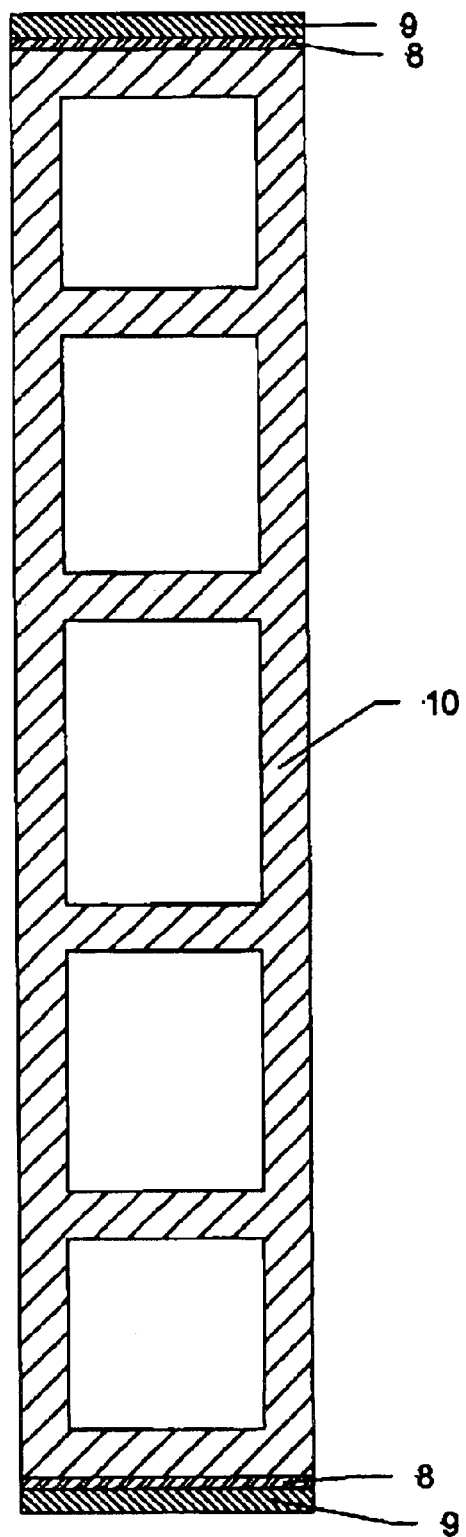
FIG. 5 shows a cross-section of one embodiment of a reinforced composite structural member of this invention with reinforcing sections that consist of a higher modulus thermoplastic material which have been bonded by coextrusion to the surface of a rectangular composite profile with a tie layer between the thermoplastic material and the profile.
Figure 6:
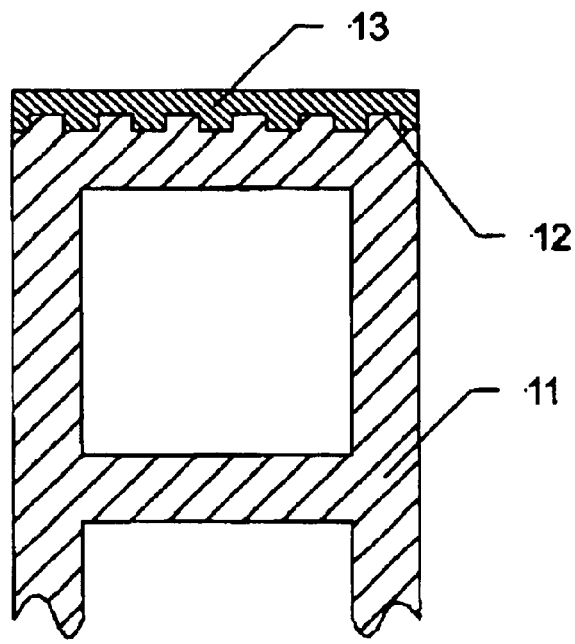
FIG. 6 shows a partial cross-section of an alternative embodiment of a reinforced composite structural member of this invention with reinforcing sections that consist of a higher modulus thermoplastic material which have been bonded by coextrusion to the surface of a rectangular composite profile with surface features to increase the bonding area between the thermoplastic material and the profile.
Figure 7:
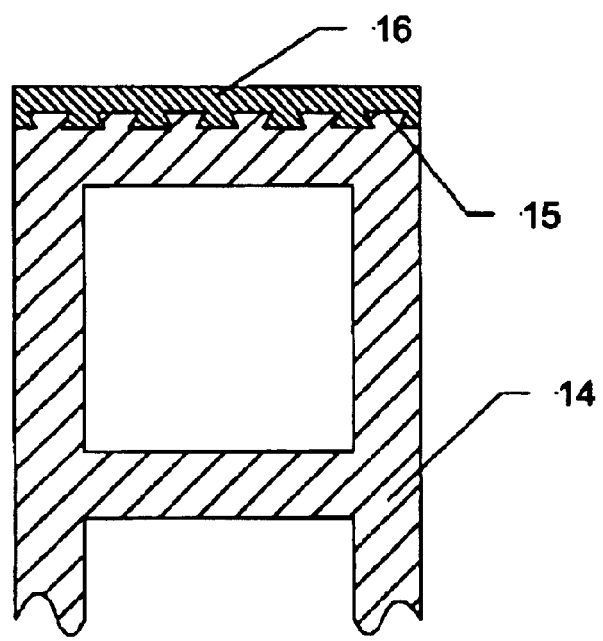
FIG. 7 shows a partial cross-section of an alternative embodiment of a reinforced composite structural member of this invention with reinforcing sections that consist of a higher modulus thermoplastic material which have been bonded by coextrusion to the surface of a rectangular composite profile with surface features meant to increase the mechanical bond between the thermoplastic material and the profile.

The coextruded higher modulus thermoplastic material may be comprised of an unfilled thermoplastic resin which has mechanical properties (particularly the stiffness as measured by the flexural modulus) which are greater than that of the composite material. In this case, thermoplastics such as polycarbonate (PC), polyetherehterketone (PEEK), polyoxymethylene (POM or acetal) or polyphenylene sulfide (PPS) might be used. However, as the majority of fiber thermoplastic resin cellulosic composite materials are produced with either polyethylene (PE), polypropylene (PP), polystyrene (PS) or polyvinyl chloride (PVC or vinyl), it may be difficult to achieve a good bond between the above resins and the composite material. One way to improve the bond, is to coextrude a tie layer material, such as are known in the industry, which will in effect act as an adhesive between the coextruded thermoplastic material and the composite material. FIG. 5 illustrates the placement of the tie layer material 8 between the coextruded higher modulus thermoplastic material 9 and the composite profile 10. Another means to improve the bond between the coextruded thermoplastic material and the composite material, is to extrude the profile with surface features which serve to enhance the bond. FIGS. 6–7 illustrate such means. In FIG. 6, the composite profile 11 is extruded with a surface features 12 which increases the contact area between the coextruded thermoplastic material 13 and the composite material, while in FIG. 7, the profile 14 is extruded with surface features 15, such as a dove tail, which in addition to increasing the contact area between the thermoplastic material 16 and the composite material, forms a mechanical bond between the materials.

While thermoplastic resins like PC, PEEK, POM or PPS might be effective at reinforcing the structural members of the present invention, there are a number of concerns including the possibility or poor bonding, the comparatively high cost of these resins and the incompatibility of the coextruded thermoplastic material and the composite material when trying to recycle and reuse scrap product. One way to overcome these concerns is to use a thermoplastic material which consists of a lower cost thermoplastic resin (such as PE, PP, PS, or PVC) and a reinforcing filler. The choice of resin and filler type and loading can be such that the resulting thermoplastic material is substantially stronger and stiffer than the composite material. In addition, if the same thermoplastic resin is chosen for the thermoplastic material and the composite material, this can substantially improve the bond between the thermoplastic material and the composite material and may eliminate the need for a coextruded tie layer material or bond enhancing surface features of the profile, as described above. By using the same thermoplastic resin, the concerns regarding material compatibility during recycling of scrap product are also minimized. There is a wide choice of reinforcing fillers which can be used to substantially increase the strength and stiffness of a given thermoplastic resin. These reinforcing fillers include fibrous materials such as glass fibers, carbon fibers, metallic fibers, thermoplastic fibers and mixtures of the different types of fibers. Mineral fillers such as talc, mica, calcium carbonate, clays and the like are also effective at increasing the mechanical properties of thermoplastic resins.

Figure 8:
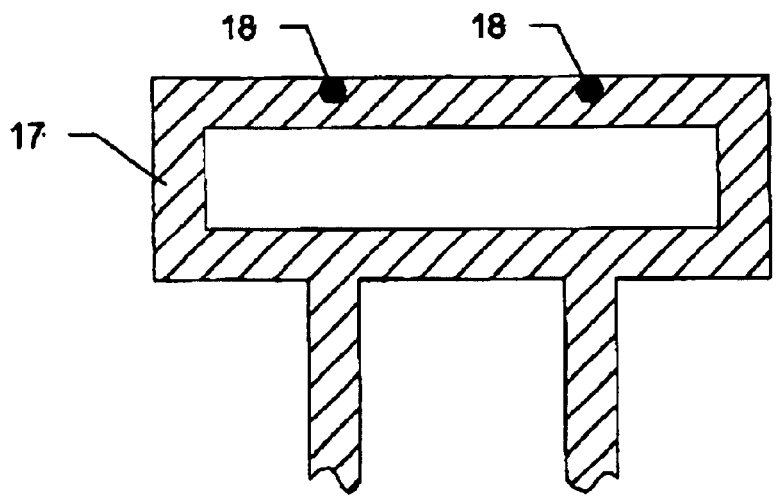
FIG. 8 shows a partial cross-section of an alternative embodiment of a reinforced composite structural member of this invention with reinforcing sections that consist of reinforcing strands that are imbedded directly into an I-beam shaped composite profile.

FIG. 8 shows a partial cross-section of an alternative embodiment of a reinforced composite structural member of this invention. In this embodiment, the composite structural member 17 has been reinforced with strands 18 that are continuous in the longitudinal direction of the member, by embedding them into the surface of the structural member. These reinforcing strands have mechanical properties, particularly as measured by the flexural modulus and tensile modulus, substantially greater than that of the thermoplastic resin cellulosic fiber composite material comprising the profile. One preferred means for embedding the continuous reinforcing strands is to heat the strands to a temperature above that of the melting point of thermoplastic resin comprising the composite material, and to then press the heat strand into the profile, where it will melt and displace the composite material. However, due to the high cellulosic fiber content of the composite material, it may be difficult to embed the reinforcing strands directly into the composite profile. This is because the cellulosic fibers may act as insulators or heat sinks making it difficult to melt the thermoplastic resin used in the composite material. Embedding the reinforcing strands may require heating them to a temperature which may result in burning of the cellulosic fibers filler in the composite material. Also, as it may difficult to displace the composite material once it has melted due to its extremely high viscosity, the force required to embed the strands may damage the composite profile.

Figure 9:
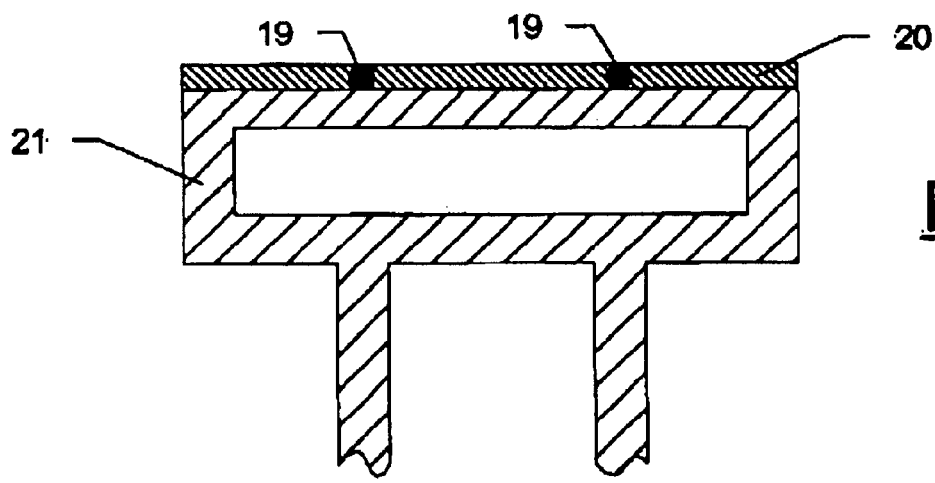
FIG. 9 shows a partial cross-section of an alternative embodiment of a reinforced composite structural member of this invention with reinforcing sections that consist of reinforcing strands imbedded in a thermoplastic material which has been bonded by coextrusion to the surface of an I-beam shaped composite profile.
Figure 10:
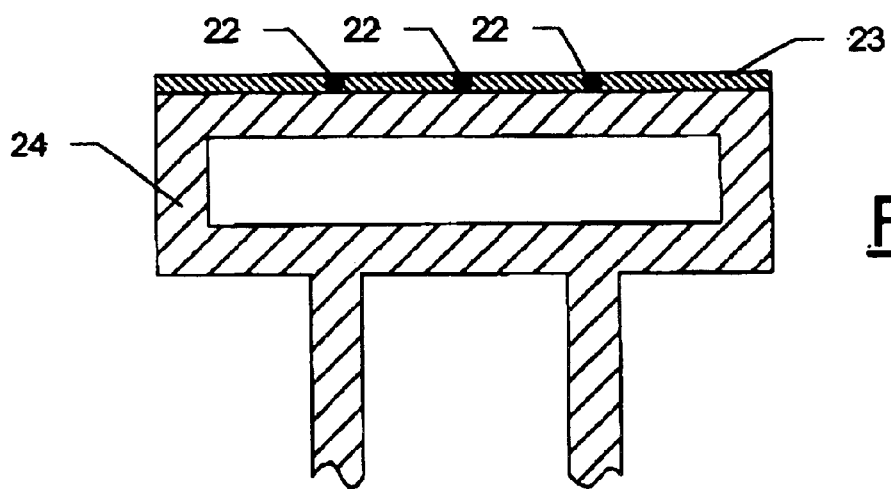
FIG. 10 shows a partial cross-section of an alternative embodiment of a reinforced composite structural member of this invention similar to that shown in FIG. 9, but showing an alternate configuration for the reinforcing strands.
Figure 11:
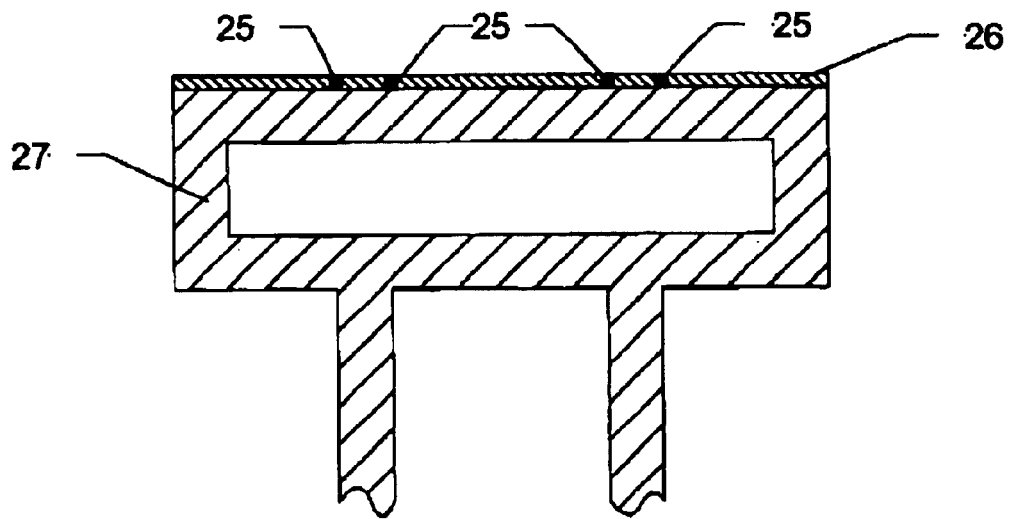
FIG. 11 is a partial cross-section of an alternative embodiment of a reinforced composite structural member of this invention similar to that shown in FIG. 9, but showing another alternate configuration for the reinforcing strands.

A means to overcome the above difficulties of trying to embed the reinforcing strands directly into the composite profile is shown in FIGS. 9–11 where varying numbers of reinforcing strands 19, 22, 25 have been embedded into sections of thermoplastic material 20, 23, 26 of varying thickness, which have been bonded to the composite profiles 21, 24, 27 by coextrusion. As can be seen in these figures, any number of reinforcing strands in a variety of placements can be incorporated into the structural members by this means. It is worth mentioning, that while one round strand has the equivalent strength and stiffness of four round strands which are half the diameter, the four strands result in twice the surface area for bonding between the strands and the thermoplastic material. This results in having to decide between the ease of embedding a fewer number of larger strands and the higher surface area available for bonding with a greater number of smaller strands. In addition, it will necessary to balance the cost of the thicker layers of the coextruded thermoplastic material required for the larger strands versus the cost of the different sized reinforcing strands.

Figure 12:
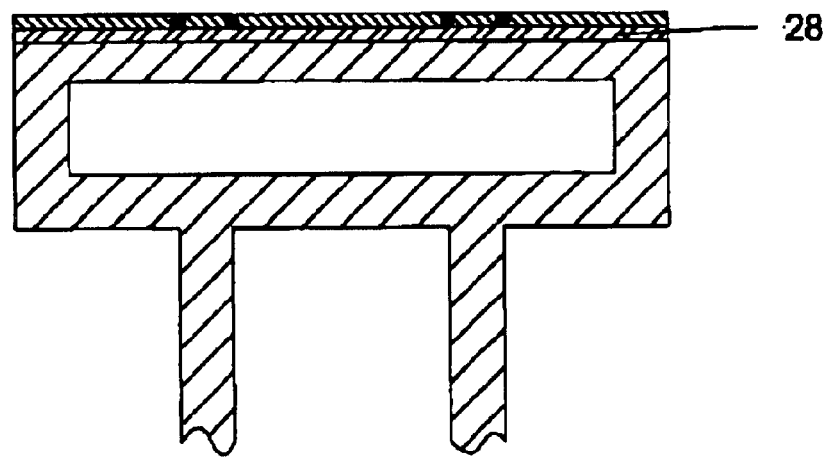
FIG. 12 shows a partial cross-section of an alternative embodiment of a reinforced composite structural member of this invention with reinforcing sections that consist of reinforcing strands imbedded in a thermoplastic material which has been bonded by coextrusion to the surface of an I-beam shaped composite profile with a tie layer between the thermoplastic material and the profile.
Figure 13:
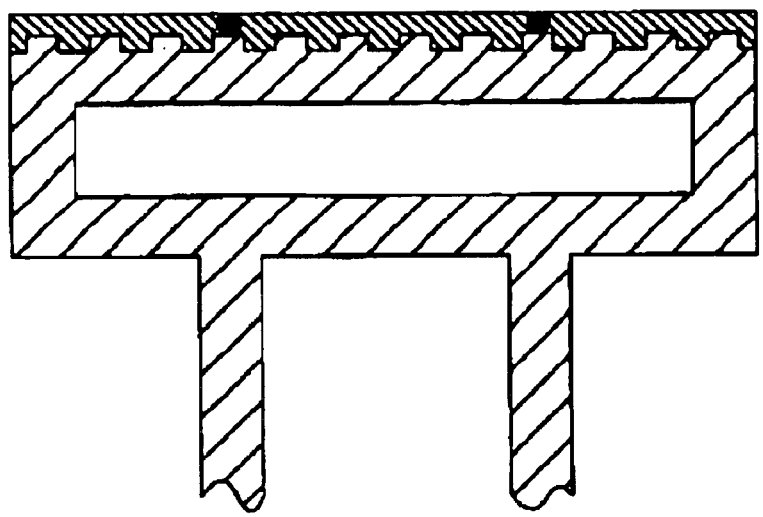
FIG. 13 shows a partial cross-section of an alternative embodiment of a reinforced composite structural member of this invention with reinforcing sections that consist of reinforcing strands imbedded in a thermoplastic material which has been bonded by coextrusion to the surface of an I-beam shaped composite profile with surface features to increase the bonding area between the thermoplastic material and the profile.
Figure 14:
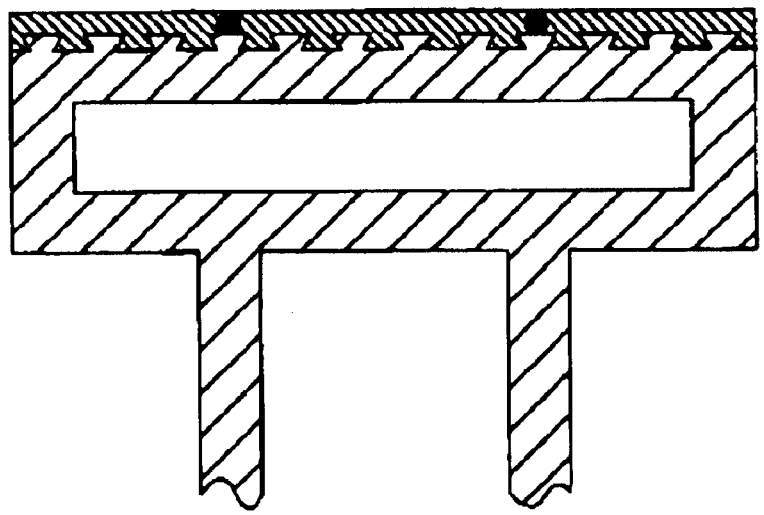
FIG. 14 shows a partial cross-section of an alternative embodiment of a reinforced composite structural member of this invention with reinforcing sections that consist of reinforcing strands imbedded in a thermoplastic material which has been bonded by coextrusion to the surface of an I-beam shaped composite profile with surface features meant to increase the mechanical bond between the thermoplastic material and the profile.

The thermoplastic material may consist of a thermoplastic resin which may or may not contain reinforcing fillers, such as those described above. When the thermoplastic material does contain reinforcing fillers, the filler content or loading should not be so high as to impede the embedding of the reinforcing strands in the thermoplastic material. Using thermoplastic resins with lower melting point temperatures, such as PE or PP, will make it easier to embed a heated reinforcing strand into the thermoplastic material sections. While the thermoplastic resins comprising the thermoplastic material and the composite material can be different resins, an improved bond would be expected if the thermoplastic resins were the same. Even if the same thermoplastic resin is used for the coextruded thermoplastic material and the composite material, it may be desirable to further enhance the bond between the thermoplastic material and the composite material. As was discussed above for the composite structural member reinforced by a coextruded layer of higher modulus thermoplastic material, the bond between the thermoplastic material and the composite profile can be improved through the use of a tie layer material 28, as is shown in FIG. 12, or the use of bond enhancing surface features, as shown in FIGS. 13–14.

As to the reinforcing strands, they may consist of glass fibers, carbon fibers, metallic fibers or wires, thermoplastic fibers or other types of continuous reinforcing fibers known in the industry. The reinforcing strands may consist of individual or multiple fibers or wires. In one preferable embodiment, the reinforcing strands will consist of wire rope or cable such as high strength aircraft cable. These wire ropes are typically formed by twisting together a large number of individual metal wires or by twisting together multiple strands that contain multiple wires that have been twisted together. Common cable configurations include 1×7, 7×7 and 7×19, in which the first number indicates the number of strands in the cable, and the second number indicates the number of individual wires in each strand. There are a number of advantages to using the wire rope or cable as the reinforcing strand in this embodiment of the invention. First, wire rope and cables are readily available in a number of different sizes. Second, as the cables are made of metal, there are a number of convenient ways in which to heat them, including induction heating and resistance heating (passing a current through the cable itself). And third, because the cables are made up of numerous individual wires and possibly numerous strands, there are a lot of recesses on the surface of the cable into which the melted composite or thermoplastic material can flow, enhancing the bond between the cable and the structural member.

Figure 15:
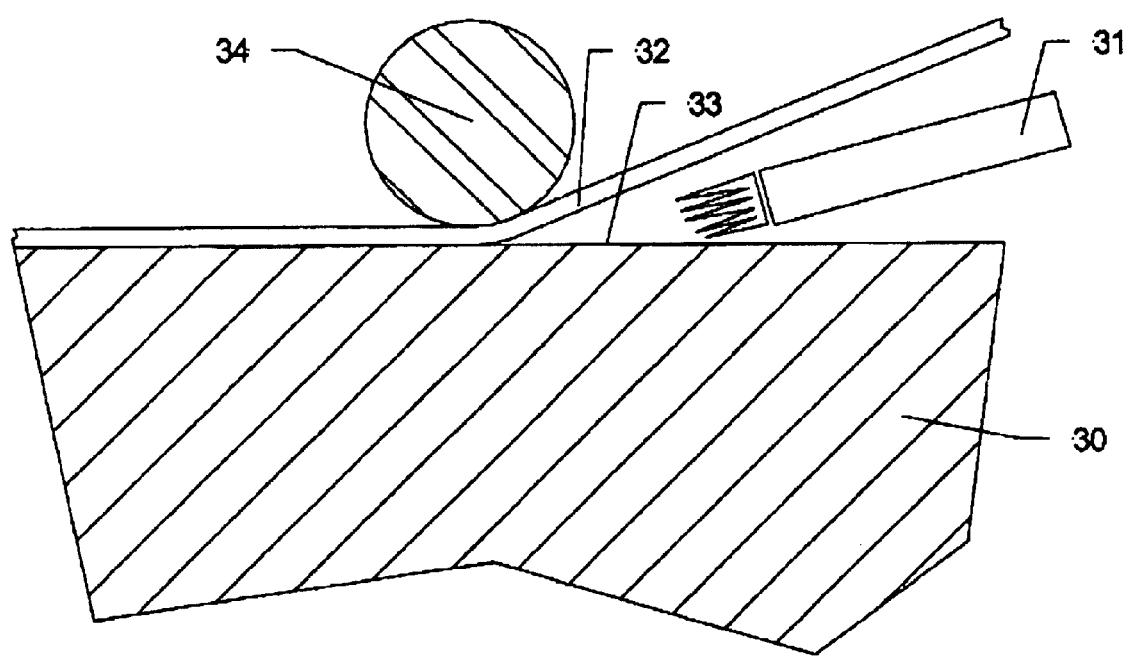
FIG. 15 is a schematic view of one embodiment of a process for bonding continuous fiber reinforced thermoplastic tape to a composite profile to form a reinforced composite structural member of this invention.

A third embodiment of the reinforced composite structural member of this invention, consists of a composite profile which has been reinforced by selectively bonding high strength tapes to the outside surface of the profile. These tapes consists of a thermoplastic resin which has been extruded around continuous fiber reinforcements. The tapes can consist of a wide variety of thermoplastic resins as well as fibers, which includes glass fiber, carbon fiber, metallic fibers and thermoplastic fibers, and can be produced in varying widths and thicknesses. FIG. 15 shows one preferred means for bonding the continuous fiber reinforced thermoplastc tape 29 to the composite profile 30 to produce a reinforced composite structural member of this invention. A high intensity heat source 31 is used to simultaneously heat the inside surface 32 of the thermoplastic tape and the outside surface 33 of the composite profile 30 in the area where it is desired to bond the tape 29. After heating, the thermoplastic tape 29 is bonded to the composite profile 30 by pressing the tape and the profile together. This can be achieved by using a roller 34 such as is schematically shown in FIG. 15. If several thermoplastic tapes are to be bonded at different locations on the surface of the composite profile, the tapes can be applied in several locations simultaneously or individually. In addition, it may desirable to apply a number of additional layers of the thermoplastic tape to the structural member to further increase the strength and stiffness of the member if one layer does not provide sufficient reinforcement.

In order to enhance the bond between the continuous fiber reinforced thermoplastic tape and the composite profile several steps can be taken. First, as discussed above, the thermoplastic resin comprising the tape and the composite material could be chosen as to be the same resin. Second, it may be desirable to coextrude a layer of either a tie layer material such as an anhydride modified polyolefin or a layer of the thermoplastic resin which is the same as that which comprises either the thermoplastic tape or the composite material. In a preferred embodiment, the thermoplastic resin comprising the coextruded material, the composite material and the thermoplastic resin of the tape are all the same resin.

By way of example to illustrate the advantage of the reinforced composite structural members of this invention, it is interesting to compare the span which could be achieved with the different reinforcement means of this invention for comparable reinforced composite structural members. In this comparison, it is assumed that the material used is a high-density polyethylene based cellulosic fiber composite whose flexural modulus is assumed to be 400 kpsi (2.8 GPa). The structural member is a nominal 2×8, which is rectangular in shape. Without reinforcement, the hollow composite profile is 7.5 in high, 1.5 in wide and has 4 horizontal internal ribs with two webs located 0.875 in from the center and two webs located 2.25 inches from the center, with the ribs and the outside walls of the profile all being 0.25 in thick. Four types of reinforced structural members are compared to the unreinforced profile. The first structural member has reinforcing sections which consist of a 0.125 in thick layer of coextruded reinforcing material on the top and bottom surfaces of the profile. The modulus of the coextruded material is assumed to be 800 kpsi, which is comparable to a 30–40% glass filled HDPE. The second structural member has reinforcing sections which consist of a 0.063 in thick layers of HDPE (modulus of 100 kpsi) coextruded onto the top and bottom surfaces of the profile with four 0.063 in steel cables (modulus of 12,000 kpsi) embedded in each of the top and bottom layers. The third structural member has reinforcing sections which consist of a 0.125 in thick layer of HDPE (modulus of 100 kpsi) coextruded onto the top and bottom surfaces of the profile with two 0.125 in steel cables (modulus of 12,000 kpsi) embedded in each of the top and bottom layers. The fourth structural member has reinforcing sections which consist of an 0.040 in thick by 1.5 in wide continuous glass fiber reinforced HDPE tape containing 50% by volume of glass fiber whose modulus is taken to be 10,000 kpsi. The tape is bonded to both the top and bottom surfaces of the profile.

Several assumption are made in calculating the spans. First, the bonding between the reinforcement and the profile in each structural member is perfect (i.e. the full reinforcing effect is transferred to the structural member). Second the structural members are to be used as joists in the construction of a deck and are spaced 16 in on center and simply supported with a uniform total loading on the deck of 50 lbs/ft² (10 lb/ft² dead load and 40 lb/ft² live load). Finally, the maximum allowable span is determined assuming a maximum allowable deflection of $1/360^{th}$ of the span and an effective moment of inertia, where the effective moment of inertia includes a factor equal to the modulus of the reinforcement divided by the modulus of the composite material by which the actual moment of the reinforcement is multiplied.

The resulting calculated spans are given in Table 1, along with the effective moment of inertia ($I_x$) about the vertical center of mass of each joist (used to determine the deflection of the joists under load). As can be seen in Table 1, for the structural member reinforced with a 0.125 inch layer of 800 kpsi modulus coextruded material both top and bottom, there is a 39.2% increase in the effective moment of inertia and an 11.5% increase in the span over the unreinforced composite profile. For the structural member reinforced with four 0.063 in diameter wire cables imbedded in a coextruded HDPE layer, both top and bottom, there is a comparable 36.0% increase in the effective moment of inertia and a 10.6% increase in the span. For the structural member reinforced with two 0.125 in diameter wire cables in a coextruded HDPE layer, both top and bottom, there is a 70.8% increase in the effective moment of inertia and a 19.4% increase in the span. Finally, for the structural member reinforced with the 0.040" thick by 1.5" wide continuous glass fiber reinforced HDPE tape there is a 77.1% increase in the effective moment of inertia and a 20.9% increase in the span. The large difference between the increase in the modulus and the increase in the span is due to the fact that the span is proportional to the cube root of the moment of inertia. As a result, the moment of inertia would have to increase by a factor of 8 in order to double the allowable span.

TABLE 1

| Structural Member Description | Effective $I_x$ (in$^4$) | Allowable span (in) |
|---|---|---|
| Hollow 2 × 8 composite profile without reinforcement | 27.06 | 74.7 |
| Hollow 2 × 8 composite profile with ⅛" coextruded higher modulus material on top and bottom surfaces | 37.67 | 83.3 |
| Hollow 2 × 8 composite profile with 4 × 1/16" embedded wire cable embedded in coextruded HDPE on top and bottom surfaces | 36.80 | 82.6 |
| Hollow 2 × 8 composite profile with 2 × ⅛" embedded wire cable embedded in coextruded HDPE on top and bottom surfaces | 46.22 | 89.2 |
| Hollow 2 × 8 composite profile with 0.040" thick glass fiber HDPE tape on top and bottom surfaces | 47.93 | 90.3 |

It will be appreciated by those skilled in the art that although the above description has indicated that the composite profile is extruded it could be made using other techniques and such other techniques are considered to be within the scope of this invention. Similarly the reinforcing material is referred to in some instances as being coextruded and there are other techniques for bonding this material to the composite profile and such techniques are considered to be within the scope of this invention. However, it is considered that extruding and coextruding where discussed is the best mode for produce the composite structural members of the present invention.

It is to be understood that while certain embodiments of this invention have been described above, the invention is not to be limited to the specific embodiments shown and described. It will be apparent to those skilled in the art that various changes may be made without departing from the scope of the invention and the invention is not to be considered limited to what is shown in the drawings and described in the specification.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. A reinforced composite structural member comprising:
   a hollow composite structural profile formed from a thermoplastic resin cellulosic fiber composite material and having an outside surface and a center of mass; and
   reinforcing thermoplastic sections having a higher stiffness as measured by a flexural modulus than said composite material and being bonded to the profile at predetermined areas, wherein the predetermined areas include at least a portion of the outside surface of the profile substantially away from the center of mass of the profile.

2. The structural member as claimed in claim 1, wherein said profile is formed with surface features adapted to enhance the bond between said profile and said reinforcing sections.

3. The structural member as claimed in claim 2, wherein said surface features increase the bonding area between said profile and said reinforcing sections.

4. The structural member as claimed in claim 2, wherein said surface features provide a mechanical bond between said profile and said reinforcing sections.

5. The structural member as claimed in claim 1, wherein said reinforcing sections are thermoplastic material which includes a thermoplastic resin.

6. The structural member as claimed in claim 5, wherein the profile is extruded and the thermoplastic material is coextruded.

7. The structural member as claimed in claim 5, wherein said reinforcing sections further include a tie layer material between said profile and said thermoplastic material.

8. The structural member as claimed in claim 7, wherein the profile is extruded and said thermoplastic material and said tie layer material are each coextruded.

9. The structural member as claimed in claim 5, wherein said thermoplastic material includes the same thermoplastic resin as is included in said composite material.

10. The structural member as claimed in claim 5, wherein said thermoplastic material further includes reinforcing filler.

11. The structural member as claimed in claim 10, wherein said reinforcing filler includes one of discontinuous and chopped fibers and the fibers are chosen from the group of glass fibers, carbon fibers, metallic fibers, thermoplastic fibers, and mixtures thereof.

12. The structural member as claimed in claim 10, wherein said reinforcing filler includes a mineral filler chosen from the group of talc, mica, calcium carbonate, clays, and mixtures thereof.

13. A structural member as claimed in claim 1, wherein said reinforcing sections include thermoplastic material bonded to said predetermined areas and continuous strands embedded into the thermoplastic material, with the strands having a modulus substantially greater than the modulus of said composite material and the thermoplastic material including a thermoplastic resin.

14. The structural member as claimed in claim 13, wherein said reinforcing sections further include a tie layer material between said profile and said thermoplastic material.

15. The structural member as claimed in claim 13, wherein said profile is extruded and said thermoplastic material is coextruded.

16. The structural member as claimed in claim 14, wherein said profile is extruded and said thermoplastic material and said tie layer material are coextruded.

17. The structural member as claimed in claim 13, wherein said thermoplastic material further includes reinforcing filler.

18. The structural member as claimed in claim 13, wherein said thermoplastic material includes the same thermoplastic resin as is included in said composite material.

19. The structural member as claimed in claim 13, wherein at least one said strand is a single fiber and said fiber is chosen from the group consisting of glass fibers, carbon fibers, metallic fibers and thermoplastic fibers.

20. The structural member as claimed in claim 13, wherein at least one said strand includes a plurality of fibers and the fibers are chosen from the group consisting of glass fibers, carbon fibers, metallic fibers, thermoplastic fibers and mixtures thereof.

21. The structural member as claimed in claim 13, wherein at least one said strand includes one of metal wire rope and metal cable which are produced by combining a plurality of individual wires.

22. A structural member as claimed in claim 1, wherein said reinforcing sections include continuous fiber reinforced thermoplastic tapes which include thermoplastic resin and continuous fibers and the fibers are chosen from the group consisting of glass fibers, carbon fibers, metallic fibers, thermoplastic fibers and mixtures thereof.

23. The structural member as claimed in claim 22, wherein said profile is extruded.

24. The structural member as claimed in claim 22, wherein said reinforcing sections further include a tie layer material between said profile and said thermoplastic tape.

25. The structural member as claimed in claim 24, wherein said profile is extruded and said tie layer material is coextruded.

26. The structural member as claimed in claim 22, wherein said thermoplastic tape includes the same thermoplastic resin as is included in said composite material.

27. The structural member as claimed in claim 24, wherein said tie layer material includes the same thermoplastic resin as is included in said thermoplastic tape.

28. The structural member as claimed in claim 22, further including a plurality of layers of said thermoplastic tape bonded at said predetermined areas of said profile.

* * * * *